Patented Feb. 12, 1935

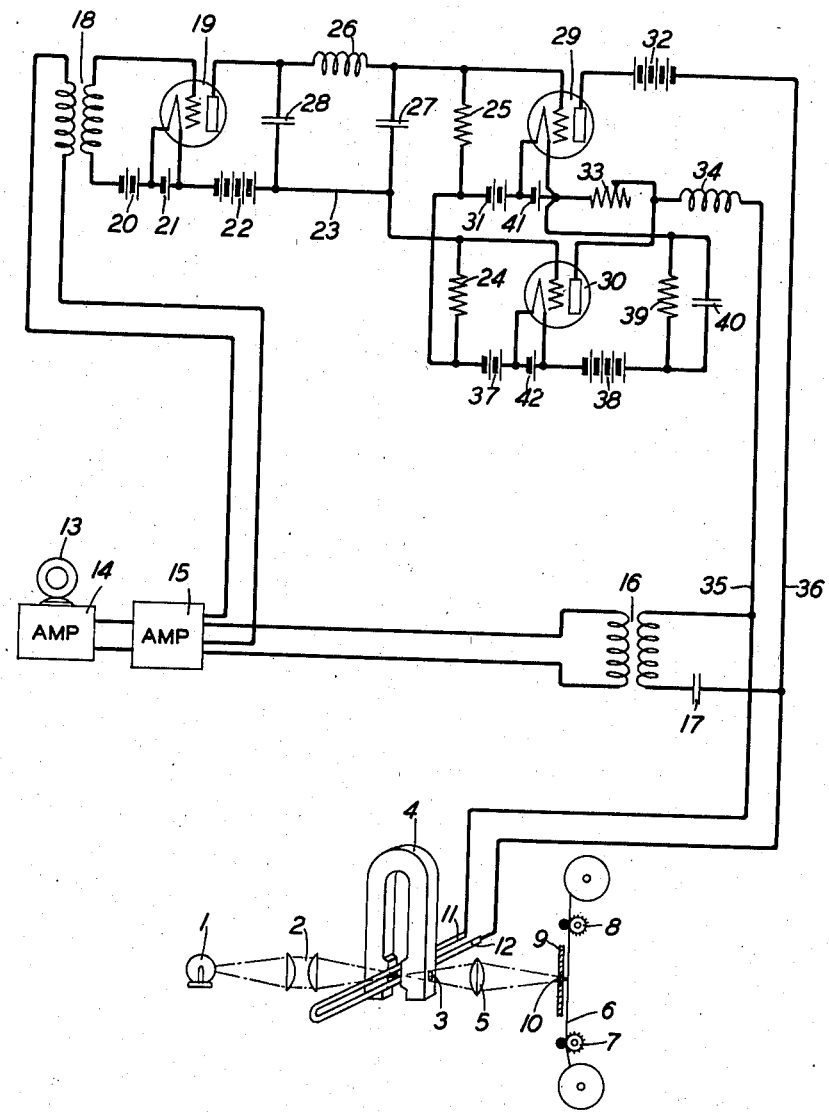

1,991,178

UNITED STATES PATENT OFFICE 1,991,178

SOUND RECORDING SYSTEM

Ray R. Scoville, Los Angeles, Calif., assignor to Electrical Research Products, Inc., New York, N. Y., a corporation of Delaware Application March 29, 1933, Serial No. 663,274

9 Claims. (Cl. 179—100.3)

This invention relates to recording systems and particularly to systems in which the mean recording position of the recording device may be at some point other than the center of the available range of the characteristic of the medium.

An object of the invention is to displace the mean recording position of the recording device from the center of the characteristic of the medium when recording signals of small amplitude, thus reducing the carrying capacity of the system.

Another object of the invention is to restore the mean recording position of the recording device to the center of the characteristic of the medium when the amplitude of the signals exceeds a predetermined value thus increasing the carrying capacity of the system to normal.

A feature of the invention resides in a control circuit containing an element which is substantially unaffected by signals of a range of small amplitudes, but is materially altered in its action by signals having an amplitude exceeding a predetermined value.

For convenience, the invention has been disclosed embodied in a system for recording modulated currents on a photographic medium. It will be apparent to those skilled in the art that the invention is applicable to the recording of the variations in any type of current, and is also applicable to recording systems using recording mediums other than a photographic film, such as a magnetized tape or engraved wax.

In known recording systems, the recording device operates over a suitable range of some selected characteristic of the recording medium. The selected characteristic may be, for example, a lateral movement in a waxy substance, a vertical movement in a waxy substance, a variation of the magnetic effect produced in a magnetic material, a variation in the area of a photographic medium exposed to a recording light, or a variation in the degree of exposure of a photographic medium. In known systems, the recording device is so adjusted that, in the absence of current to be recorded, the mean recording position is in the center of the selected characteristic; and is varied above and below this center position by the variations in the current to be recorded.

As the known types of recording mediums are not perfectly homogeneous, a certain amount of noise is produced during the reproduction of the record, due to the irregularities in the original record and in the copy reproduced. Experiments have shown that the noise currents produced during the reproduction of a positive print of a photographic record are proportional to the mean value of the transmission of the positive print, that is, to the mean value of the scanning flux impressed on the photo cell or other reproducing device. An analogous relation has been found in many other forms of recording. In the present invention, the mean value of the transmission of the positive print is small for small amplitudes of the record, and is increased to a normal value for larger amplitudes of the record. If the photographic processes do not create any distortion, the light flux transmitted through the positive print will be proportional to the light flux originally impressed on the photographic record, or, in other words, the exposure of the negative record is proportional to the transmission of the positive print.

In accordance with the present invention, the recording device is mechanically adjusted so that the mean value or position of the recording flux is in the center of the available range of the selected characteristic of the negative film. A controllable bias is then applied to the recording device to displace the mean value or position of the recording flux from the center of the available range to the lower end of the range of the characteristic. The exposure of the negative is thus reduced to some small value. Modulated currents having a maximum amplitude less than the value determined by this adjustment may then be recorded but due to the small exposure, a very light negative will be produced and the positive print will be correspondingly dark.

A control circuit energized by the modulated currents, controls the magnitude of the biasing current applied to the recording device. A known type of thermionic amplifier, filled with one of the rare gases, is connected in the control circuit. When the amplitude of the modulated currents exceeds a certain value determined by the characteristics of this gas-filled amplifier, the amplifier breaks down, a large current flows and reduces the effect of the biasing current to zero, thus restoring the recording device to the condition determined by its mechanical adjustment and increasing the exposure of the negative to the value at the center of the characteristic. When the amplitude of the modulated currents again falls to a small value, a second gas-filled amplifier is actuated and restores the ampifier first actuated. The effect of the biasing current is thus restored to its initial value, and the exposure of the negative record again reduced to a small value.

The drawing shows in diagrammatic form a film sound recording system including a preferred form of the invention.

For convenience of description, a film sound recording system using a ribbon light valve has been disclosed. The invention is not thereby to be limited to the specific type of recorder disclosed, but is obviously applicable to any other suitable recorder operating on any suitable medium, such as a magnetized tape or wax record, and may be utilized to record the variations in any type of signal currents. The specific type of light valve disclosed is described in detail in an article "The principles of the light valve" by T. E. Shea, W. Herriott and W. R. Goehner, published in the Journal of the Society of Motion Picture Engineers vol. XVIII, pages 697–730, June, 1932.

Light from a suitable source 1 is focussed by a lens system 2 through aligned apertures 3 pierced in the pole faces of a permanent magnet 4. The light emerging from the aperture 3 is focussed by a lens system represented by the lens 5 on a film 6 moved at constant speed in a known manner by the sprockets 7, 8 or other suitable means. An opaque plate 9 pierced by a small aperture 10 limits the exposed area of the film 6. A pair of conductive ribbons 11, 12, which may be parts of a single ribbon, limit the height lengthwise of the film of the image formed by the recording beam. The ribbons 11, 12 are so mounted and supported that, in the absence of any current flowing in the ribbons, the image produced on the moving film will product an exposure in the center of the range of the characteristic to be used in recording. When an electric current flows in the ribbons 11, 12, the reaction of the magnetic field produced by this current with the steady field produced by the magnet 4 will cause a displacement of the ribbons 11, 12 proportional to the current, increasing or decreasing the height of the image formed on the film 6 and thus varying the time of exposure of the film 6 to the recording beam.

Acoustic waves are detected by a suitable detector, such as the microphone 13, which thus becomes a source of signal currents. The signal currents may be amplified in suitable amplifiers 14 and 15. A portion of the amplified signal currents is applied through transformer 16 and capacitor 17 to the ribbons 11, 12 of the light valve, and causes the ribbons 11, 12 of the light valve to oscillate in accordance with the instantaneous variations in the signal currents.

A portion of the amplified signal currents is applied through transformer 18 to a rectifier 19. The rectifier 19 has, for convenience, been disclosed as a three-element vacuum tube or thermionic triode, but it will be obvious that many other rectifiers, such as a copper-oxide-copper couple, may be used. A battery 20 impresses a suitable negative potential on the control electrode of the triode 19. The cathode of the triode 19 may be heated by a battery 21, or other suitable source of current. The triode 19 may be adjusted to produce rectification in the control electrode-cathode circuit, with subsequent amplification in the anode-cathode circuit or to produce partial or complete rectification by the conjoint action of the control electrode-cathode circuit and the anode-cathode circuit.

Current from a suitable source, such as battery 22, flows through wire 23, resistor 24, resistor 25, inductor 26, anode-cathode circuit of triode 19 back to battery 22. This current will cause the upper end of resistor 24 to become more positive than the lower end, and the upper end of resistor 25 to become more negative than the lower end. When signal currents are applied by the transformer 18 to the rectifier 19, the current flowing in the resistors 24 and 25 will increase. The capacitors 27 and 28, in conjunction with the inductor 26, form a low-pass filter and cause the current flowing in resistors 24 and 25 to vary only with the envelope of the variations in the signal currents.

The control devices 29 and 30 are gas-filled three-element vacuum tubes, or trionodes, such as briefly described in an article "A method of obtaining a linear time axis for a chathode ray oscillograph" by A. L. Samuel, published in The Review of Scientific Instruments, vol. 2, pages 532–540, September, 1931. The trionode may be of the same general dimensions and appearance as the triodes in general use in radio receiving sets, but is filled with some suitable gas, such as argon, at a low pressure. The characteristics of the trionode are such that, for any given anode potential, there is a critical control-electrode potential. If the control-electrode potential with respect to the cathode is more negative than the critical value, the anode-cathode current is small and is usually substantially zero. If the control-electrode potential with respect to the cathode is less negative than the critical value, the anode-cathode current is no longer influenced by the control-electrode potential, a visible discharge occurs between anode and cathode, and the anode-cathode current is determined by the potential between anode and cathode and by the resistance in the anode-cathode circuit. While the visible discharge continues, the potential drop inside the trionode between anode and cathode is of the order of the ionizing potential of the gas and will generally be some 15 to 25 volts. The potentials required to produce the visible discharge are generally rather critical. To restore the trionode to the non-discharging condition, after applying a negative potential larger than the critical value to the control electrode, the anode-cathode potential must be interrupted or annulled for a short time. The potentials required to restore in trionode to the non-discharging condition are, in general, less critical than the potentials required to produce the discharge.

The battery 31 is of such potential that, in the absence of signal currents, the potential of the control electrode of the trionode 29 is less negative than the critical potential. Current will thus flow from battery 32, anode to cathode of the trionode 29, resistor 33, inductor 34, wire 35, ribbons 11 and 12 of the light valve, wire 36 to battery 32. The current flowing in the ribbons 11, 12 causes the ribbons 11, 12 to be drawn together, thus reducing the mean time of exposure of the film 6 and the load carrying capacity of the light valve. By adjusting the resistance 33, the current flowing in the ribbons 11, 12 and the reduction in the load carrying capacity of the light valve may be adjusted. For general use, the current is adjusted so that, in the absence of signal currents, the spacing of the ribbons 11, 12 is about one-third of the spacing determined by the mechanical adjustment.

The battery 37 is of such potential that, in the absence of signal currents, the potential of the control electrode of the trionode 30 is more negative than the critical potential. The anode-cathode current of the trionode 30 is thus substantially zero.

When signal currents are applied to the system, the rectified current flowing in the resistor 25 increases the negative potential applied to the control electrode of the trionode 29 while the current flowing in resistor 24 decreases the potential applied to the control electrode of the trionode 30. So long as the signal currents have an amplitude less than a certain value, the steady current applied to the ribbons 11, 12 will remain unchanged. The signal currents applied by the transformer 16 will cause the ribbons 11, 12 to vibrate and vary the time of exposure of the film 6 thus producing a record of the signal currents.

Although the anode-cathode current of the trionode 30 is substantially zero, current from the battery 38 can flow through resistor 39, and batteries 41, 31, 37, 42 to battery 38, thus charging the capacitor 40.

When the signal currents increase to an amplitude such that the potential developed across resistor 24 reduces the potential applied to the trionode 30 to less than the critical value, the trionode 30 will break down and the capacitor 40 can then discharge through resistor 33 and the anode-cathode circuit of trionode 30. Current from battery 38 can also flow through resistors 39 and 33 and the anode-cathode circuit of trionode 30. This sudden spurt of current in resistor 33 produces a drop of potential across the resistor 33 which reduces the anode potential of the trionode 29 and stops the discharge through trionode 29. The steady current applied to the ribbons 11, 12 decreases to zero and the mean spacing of the ribbons increases to the value determined by the mechanical adjustment. The load carrying capacity of the light valve thus increases to its maximum value.

So long as the potential applied by the battery 31 together with the potential difference due to the rectified signal currents flowing in the resistor 25 maintains the control-electrode of the trionode 29 more negative than the critical potential, the trionode 29 cannot discharge. When the signal currents again fall to a small value, the rectified current flowing in resistors 24 and 25 will decrease to a small value, and the trionode 29 will break down and reestablish the steady current through the ribbons 11, 12, thus reducing the load carrying capacity of the light valve to its former small value. The potential applied to the control electrode of the trionode 30 will become more negative than the critical value. As the discharge current of the trionode 30 must pass through the resistors 39 and 33, if the resistance of the resistor 39 is large, the discharge current will be small and the large negative potential applied to the control electrode will stop the discharge, restoring the whole control circuit to the initial conditions.

What is claimed is:

1. In a recording system, a source of signal currents, a recording medium, a recording device actuated by said signal currents and mechanically adjusted to normally produce a record about a desired point in the available characteristic of said medium, a control circuit coupled to said device, means in said control circuit for electrically displacing said device from said normal point to produce a record about a second recording point throughout a predetermined range of small amplitudes of said signal currents, and other means in said circuit actuated only by signal currents having amplitudes outside said range to neutralize the effect of said first means.

2. In a recording system, a source of signal currents, a recording medium, a recording device actuated by said signal currents and mechanically adjusted to normally produce a record about a predetermined point in the characteristic of said medium, a control circuit coupled to said device, means in said control circuit for electrically displacing said device from said normal point to produce a record about a second recording point throughout a predetermined range of small amplitudes of said signal currents, means in said circuit actuated only by signal currents having amplitudes outside said range to neutralize the effect of said first means and means in said circuit for rendering said neutralization ineffective when the amplitude of said signal currents is within said predetermined range.

3. In a recording system, a source of signal currents, a recording medium, a recording device actuated by said signal currents and mechanically adjusted to normally produce a record about a desired point in the available characteristic of said medium, a control circuit coupled to said device, a source of current in said circuit, means for supplying current from said source to said device for displacing said device from said recording point to produce a record about a second recording point, means responsive to signal currents exceeding a predetermined range of small amplitudes to reduce said current to a small value, and other means in said circuit responsive to signal currents within said range of amplitudes for restoring said displacing current to its original value.

4. In a recording system, a source of signal currents, a recording medium, a recording device actuated by said signal currents and mechanically adjusted to produce a record about a desired point in the characteristic of said medium, a control circuit coupled to said device, a source of unidirectional current, means for supplying current from said source for displacing said device from said recording point, a gas-filled ionic device responsive to signal currents exceeding a predetermined range of amplitudes to reduce said unidirectional current to a small value, and a second gas-filled ionic device responsive to signal currents within said range to restore said first ionic device to its original condition.

5. In a recording system, a source of signal currents, a recording medium, a recording device actuated by signal currents, a gas-filled ionic device, a circuit for applying a potential of less than the critical value to the control electrode of said ionic device, a source of current in serial relation with said recording device and the anode-cathode circuit of said ionic device whereby the discharge through said ionic device reduces the load carrying capacity of said recording device, a second circuit for applying a potential derived from said signal currents to said control electrode, a second gas-filled ionic device, a third circuit for applying a potential exceeding the critical value to the control electrode of said second ionic device, a fourth circuit for applying a potential derived from said signal currents to the control electrode of said second ionic device whereby when the amplitude of said signal currents exceeds a predetermined value said second ionic device will discharge and reduce the discharge through said first ionic device to a small value thus increasing the load carrying capacity of said recording device.

6. In a recording system, a source of signal currents, a recording medium, a recording device actuated by signal currents to produce a record in said medium, a gas-filled ionic device, a circuit for applying a potential of less than the critical value to the control electrode of said ionic device, a source of current in serial relation with said recording device, the anode-cathode circuit of said ionic device and a resistor, a second gas-filled ionic device, a second circuit for applying a potential exceeding the critical value to the control electrode of said second ionic device, a second source of current in serial relation with the anode-cathode circuit of said second ionic device, said resistor and a second resistor, a capacitor in parallel relation with said second resistor, and a third circuit for applying potentials derived from said signal currents to reduce the potentials applied to the control electrodes of both said ionic devices.

7. In a recording system, a source of signal currents, a recording medium, a recording device actuated by signal currents to produce a record in said medium, a gas-filled ionic device, a circuit for applying a potential of less than the critical value to the control electrode of said ionic device, a source of current in serial relation with said recording device, the anode-cathode circuit of said ionic device and a resistor, a second gas-filled ionic device, a second circuit for applying a potential exceeding the critical value to the control electrode of said second ionic device, a second source of current in serial relation with the anode-cathode circuit of said second ionic device, said resistor and a second resistor, a capacitor in parallel relation with said second resistor, a third resistor in the control electrode-cathode circuit of said first ionic device, a fourth resistor in the control electrode-cathode circuit of said second ionic device, said third and fourth resistors being in serial relation, and a circuit for supplying rectified signal currents to said third and fourth resistors.

8. In a recording system, a recording medium, a source of signal currents, a recording device actuated by signal currents, a control circuit coupled to said device and means in said control circuit including a plurality of ionic devices for displacing the recording point of said device in predetermined steps.

9. In a recording system, a recording medium, a source of signal currents, a recording device actuated by signal currents, a control circuit coupled to said device, means in said control circuit including an ionic device actuated by signal currents within a predetermined range of amplitudes for displacing the recording point of said device in steps, and other means including an ionic device actuated by signal currents having amplitudes outside said range to restore the recording point of said device.

RAY R. SCOVILLE.